US007881320B1

(12) United States Patent
Schumacher et al.

(10) Patent No.: US 7,881,320 B1
(45) Date of Patent: Feb. 1, 2011

(54) PARSING DATA FROM MULTIPLE DIGITAL BITSTREAMS

(75) Inventors: Paul R. Schumacher, Berthoud, CO (US); Kornelis Antonius Vissers, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 920 days.

(21) Appl. No.: 11/299,854

(22) Filed: Dec. 12, 2005

(51) Int. Cl.
*H04L 12/50* (2006.01)
*H04L 12/28* (2006.01)
*G06F 13/00* (2006.01)
*G06F 9/26* (2006.01)

(52) U.S. Cl. .................. 370/412; 370/383; 370/419; 711/137; 711/204; 711/213

(58) Field of Classification Search ......... 370/412–419; 348/423.1
See application file for complete search history.

(56) References Cited

U.S. PATENT DOCUMENTS

| | | | | |
|---|---|---|---|---|
| 5,623,423 A * | 4/1997 | Lipovski | ..................... | 708/203 |
| 5,677,980 A * | 10/1997 | Naoe | ..................... | 386/109 |
| 5,978,855 A * | 11/1999 | Metz et al. | ................... | 709/249 |
| 6,490,371 B1 * | 12/2002 | Aoki et al. | ................... | 382/232 |
| 6,628,660 B1 * | 9/2003 | Morse | ...................... | 370/395.7 |
| 6,748,020 B1 * | 6/2004 | Eifrig et al. | ............. | 375/240.26 |
| 6,823,131 B2 * | 11/2004 | Abelard et al. | ................ | 386/68 |
| 7,221,684 B1 * | 5/2007 | Smith et al. | ................... | 370/477 |
| 2001/0017594 A1 * | 8/2001 | Ahn | ............................. | 341/59 |
| 2002/0122430 A1 * | 9/2002 | Haberman et al. | .......... | 370/429 |
| 2002/0191626 A1 * | 12/2002 | Moriwaki et al. | ........... | 370/413 |
| 2003/0093632 A1 * | 5/2003 | Osborne | ..................... | 711/154 |
| 2005/0060420 A1 * | 3/2005 | Kovacevic | ................... | 709/231 |
| 2005/0195902 A1 * | 9/2005 | Chung, II | ............. | 375/240.25 |
| 2005/0281334 A1 * | 12/2005 | Walker et al. | .......... | 375/240.16 |
| 2006/0098675 A1 * | 5/2006 | Okuno | ....................... | 370/412 |

OTHER PUBLICATIONS

Iyer et al., "Analysis of a Memory Architecture for Fast Packet Buffers," IEEE 2001.*
U.S. Appl. No. 11/404,205, filed Apr. 14, 2006, Cappello et al.

* cited by examiner

*Primary Examiner*—Daniel J Ryman
*Assistant Examiner*—Thinh D Tran
(74) *Attorney, Agent, or Firm*—W. Eric Webostad; Kevin T. Cuenot; Thomas George

(57) ABSTRACT

Multiplexing data from bitstreams is described. Data status is determined for data of each of the bitstreams. Stream numbers are assigned respectively to the bitstreams, and the data of each of the bitstreams is controllably stored in respective memory. A memory buffer of the memory buffers is controllably selected. The data obtained from the memory buffer selected is parsed to provide an output. The controllably selecting and the parsing are repeated to obtain and parse the data stored in at least one other memory buffer of the memory buffers to provide the output. The output is multiplexed data from the bitstreams respectively associated with the memory buffer and the at least one other memory buffer.

18 Claims, 7 Drawing Sheets

```
case currState is when Initialize =>
        <initialization steps here>
        nextState = ParseMainHeader;

when ParseMainHeader =>
        <parse main header of stream 's' here>
        <and store information for stream 's'>
        if (end of header found) then
            if (s < STREAMS-1) then
                s = s + 1;
                nextState = ParseMainHeader;
            else
                s = 0;
                d = 0;
                nextState = ParseDataChunk;
            end if;
        end if;

when ParseDataChunk =>
        <parse data chunk 'd' of stream 's' here>
        if (end of data chunk 'd' found) then
            if (s < STREAMS-1) then
                s = s + 1;
            else
                d = d + 1;
                s = 0;
            end if;
            nextState = ParseDataChunk;
        end if;

end case;
```

FIG. 7

PARSING DATA FROM MULTIPLE DIGITAL BITSTREAMS

FIELD OF THE INVENTION

One or more aspects of the invention relate generally to data processing and, more particularly, to parsing data from multiple digital bitstreams.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

As multimedia applications, as well as communication systems, become more and more prevalent, there is an ever increasing need for systems to simultaneously handle data from multiple data sources. Examples of applications involving multiple data sources include: multi-camera security and surveillance systems, video/multimedia conferencing, multi-channel audio processing, and other various known types of multi-channel digital communications. Heretofore, there may have been one "decoder" for each data source. By use of the term "decoder" it should be understood that any of a variety of types of integrated circuits may be used. For example, the use of the term is decoder includes any of the following, as well as any combination of the following: sequencer, digital signal processor, and coder/decoder ("CODEC"). With respect to FPGAs, one or more of these integrate circuits may fully or partially be implemented in programmable logic.

Thus, for example, for a system where two data sources were communicating with one data user, the data user system would have two decoders to handle bitstreams from the two data sources. Notably, having multiple decoders associated with multiple data sources adds complexity to applications. Such applications, owing to use of multiple decoders, meant that factors such as operating flags, source-dependent constants, state variables, and dynamic register values, among other factors, made multiplexing data from multiple digital bitstreams relatively complex. For example, switching between input sources may involve well-defined complex state capture procedures for both front end parsing of data from multiple digital bitstreams and back end processing of such parsed information.

Accordingly, it would be desirable to provide a decoding architecture for instantiation in hardware, which may include at least in part programmable logic, capable of handling multiple digital bitstreams that reduces the complexity, and thus cost, associated with prior communication systems.

SUMMARY OF THE INVENTION

One or more aspects of the invention generally relate to data processing and, more particularly, to parsing data from multiple digital bitstreams.

An aspect of the invention is a method for multiplexing data from bitstreams. Data status is determined for data of each of the bitstreams. Stream numbers are assigned respectively to the bitstreams such that each of the bitstreams has an associated stream number. The data of each of the bitstreams is controllably stored in respective memory buffers, the bitstreams and the memory buffers being associated with one another. A memory buffer of the memory buffers from which to obtain the data stored therein is controllably selected. The data obtained from the memory buffer selected to provide an output is parsed. The controllably selecting and the parsing are repeated to obtain and parse the data stored in at least one other memory buffer of the memory buffers to provide the output with the data obtained from the at least one other memory buffer in addition to the data obtained from the memory buffer. The output is multiplexed data from the bitstreams respectively associated with the memory buffer and the at least one other memory buffer.

Another aspect of the invention is a decoder, comprising a front end decoder including an input interface coupled to a parser and a back end decoder coupled to the parser of the front end decoder. The input interface includes first storage buffers respectively coupled to receive data streams and a controller coupled to the first storage buffers and the parser. The controller is configured to provide respective write control signals to the first storage buffers and to provide respective read control signals to the first storage buffers. The controller is configured to assert the write control signals responsive to data status and stream number information respectively associated with the data streams. The controller is configured to assert the read control signals responsive to read stream commands and stream numbers asserted in respective pairs for respectively reading the data streams, the read stream commands and the stream numbers being from the parser. The parser is coupled to receive each of the data streams after buffering in the first storage buffers responsive to selective assertion of the read control signals.

Yet another aspect of the invention is a system for multiplexing data from bitstreams. A network interface is coupled to receive the bitstreams and is configured to identify the bitstreams by bitstream number and to check data status of the bitstreams. A decoder is coupled to the network interface to receive the bitstreams therefrom. The decoder includes a front end decoder including an input interface coupled to a parser and a back end decoder coupled to the parser of the front end decoder. The input interface includes storage buffers respectively coupled to receive the bitstreams and a controller coupled to the storage buffers and the parser. The controller is configured to provide respective write control signals to the storage buffers and to provide respective read control signals to the storage buffers.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 7 is a pseudo-code listing of an exemplary embodiment of a parser.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
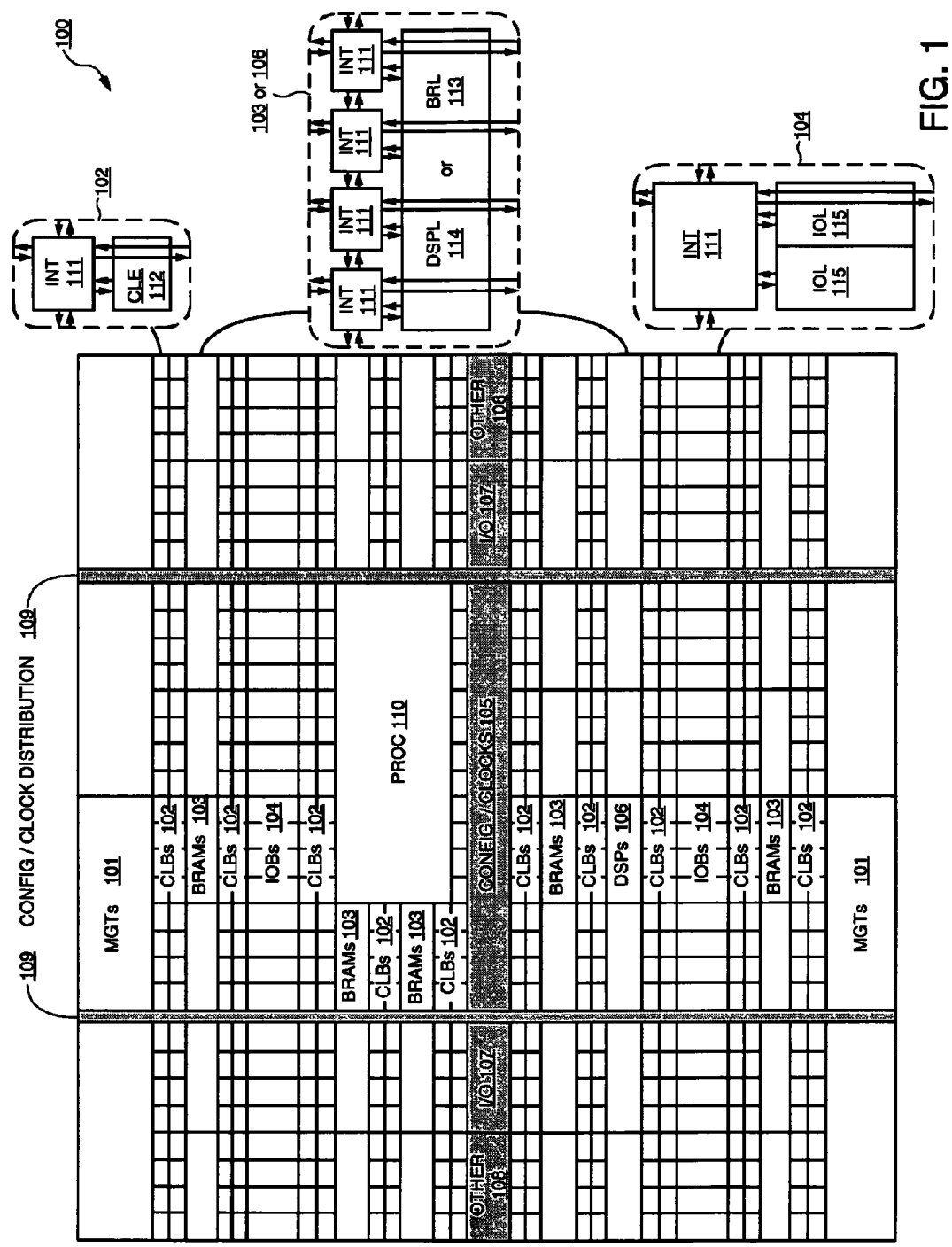
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110. In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

What follows is a description of method and apparatus for inputting, storing, and operating on multiple digital bitstreams. Generally, these bitstreams are delivered to a decoder via a communication network. The decoder parses information from the multiple digital bitstreams, such that a single decoder may be used to handle multiple digital bitstreams from multiple data sources for a high-end communication system. The implementation of a single decoder and, more particularly, a single parser for parsing information from multiple digital bitstreams simplifies downstream processing owing to having a more coherent system.

Figure 2:
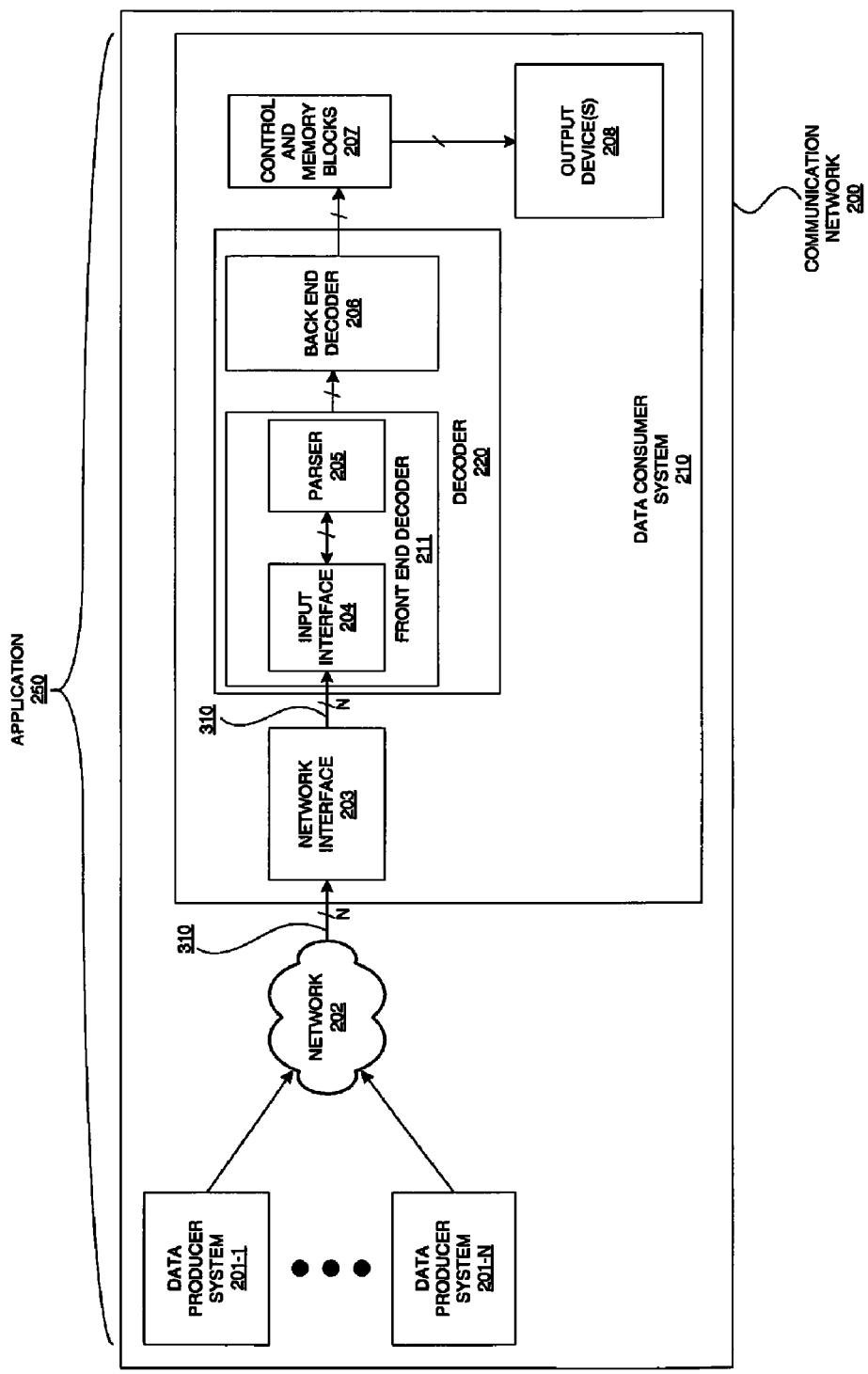
FIG. 2 is a high-level network diagram depicting an exemplary embodiment of a communication network.

FIG. 2 is a high-level network diagram depicting an exemplary embodiment of a communication network 200. Communication network 200 may be used as a platform for an application 250 for data communication. More particularly, data producer systems 202-1 through 201-N, for N a positive integer greater than one, provide respective data bitstream inputs to a network 202. Network 202 may be a public network, such as the Internet, a private network, or a combination of a public and private network. Furthermore, network 202 may include a Publicly Switched Telephone Network ("PSTN"), an Integrated Services Digital Network ("ISDN"), or a combination thereof.

Data from producer systems 201-1 through 201-N provided to network 202 is received by a data consumer system 210 as N digital bitstreams 310. Digital bitstreams 310 are provided to network interface 203 of data consumer system 210. Data consumer system 210 includes, in addition to network interface 203, decoder 220, control and memory blocks 207, and one or more output devices 208. FPGA 100 of FIG. 1 may be used to implement data consumer system 210, where programmable logic is used to configure one or more blocks of such data consumer system 210. Notably, the terms "producer" and "consumer" are used to more clearly describe where data is going from and to. However, it should be understood that these terms may be omitted within the phrases "data producer system" and "data consumer system" as used herein.

Decoder 220 includes a front end decoder 211 and a back end decoder 206. Digital bitstreams 310 are provided from network interface 203 to an input interface 204 of front end decoder 211. Input interface 204 temporarily stores data associated with digital bitstreams 310 for parser 205 of front end decoder 211 in a controlled manner. Data from digital bitstreams 310 is provided from input interface 204 to parser 205, also in a controlled manner. Such data may be parsed by parser 205 for provisioning to back end decoder 206. Output of back end decoder 206 may be provided to control and memory blocks 207 for one or more output devices 208. Notably, although the description that follows is done in terms of a PLD and, more particularly, an FPGA, it should be understood that a combination of dedicated and programmable circuitry may be used. Furthermore, it is not necessary to use PLDs, as application-specific integrated circuits, other application-specific standard products, or other types of integrated circuit microchips may be used.

Figure 3:
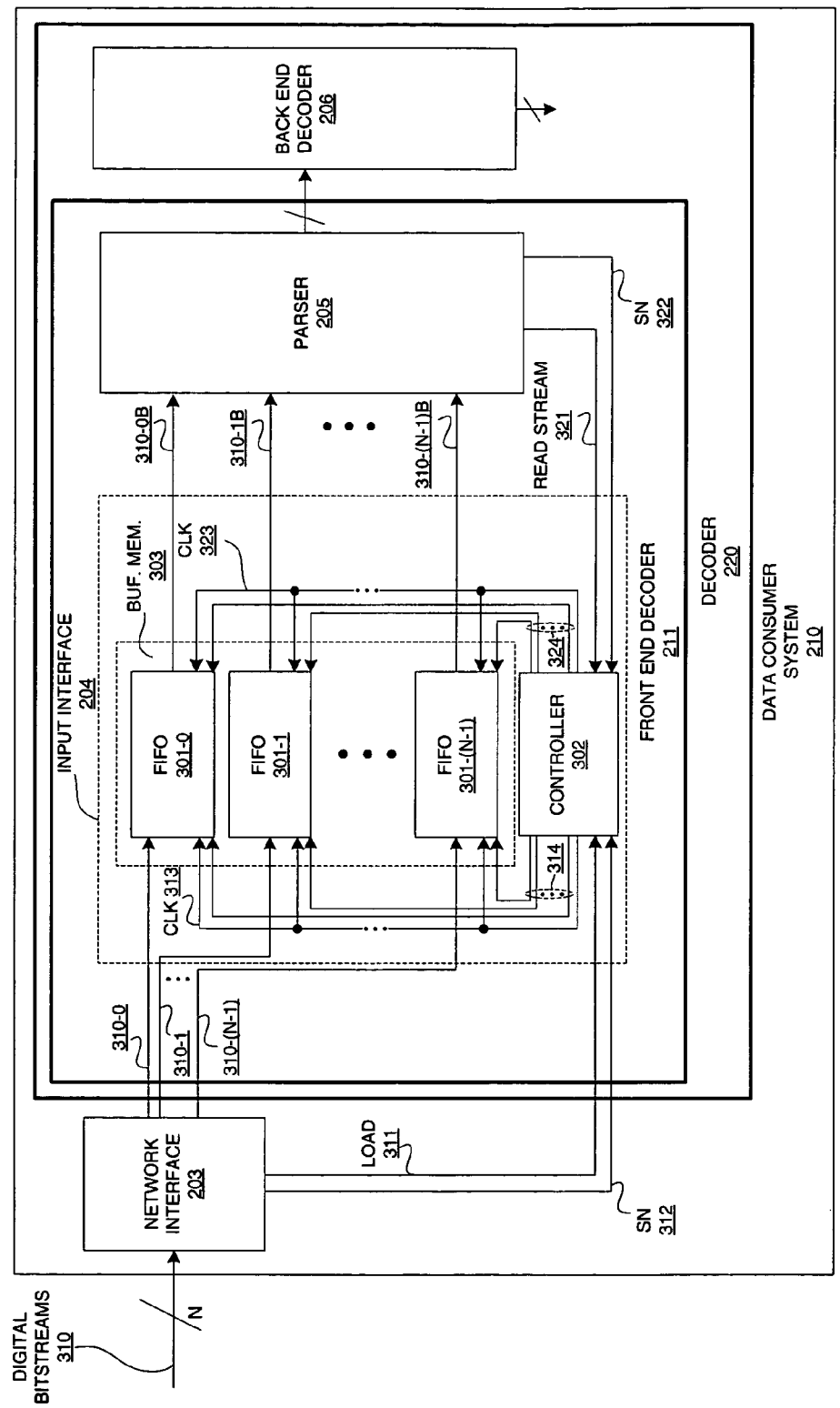
FIG. 3 is a high-level block diagram depicting an exemplary embodiment of a data consumer system in the communication network of FIG. 2.

FIG. 3 is a high-level block diagram depicting an exemplary embodiment of data consumer system 210 of FIG. 2. N digital bitstreams 310 are provided to network interface 203. Network interface 203 may be any known network interface capable of establishing a communication link with multiple input digital bitstreams 310, identifying whether data in each of such bitstreams is valid, and associating with each bitstream 310 a respective stream number to each such bitstream. As such network interfaces 203 are well known, unnecessary detail regarding them is avoided for purposes of clarity.

Output of network interface 203 includes individual digital bitstreams 310-0 through 310-(N-1). In this example, there are at least three digital bitstreams 310, though there may be only two or more than three digital bitstreams, depending on the capabilities of network interface 203 and the data rates associated with digital bitstreams 310 which may vary from implementation to implementation. Accordingly, data from network interface 203 is provided from each individual bitstream 310-0 through 310-(N-1) to input interface 204 of front end decoder 211. In an implementation of input interface 204, such input interface 204 may be scalable based on the value of N as associated with digital bitstreams 310. The value of N may be specified by the creator of data consumer system 210, and in response the infrastructure of input interface 204 may automatically be built based on this value. Thus, it should be appreciated that use of programmable logic of an FPGA, such as FPGA 100 of FIG. 1, to provide input interface 204 may facilitate such scaling. However, alternatively an application specific integrated circuit ("ASIC"), another type of application specific standard product ("ASSP") other than an FPGA, or other hardware configured to provide handling of a maximum of N digital bitstreams may be used, where some amount digital bitstreams equal to or less than N may be handled. Input interface 204 includes buffer memory 303. Buffer memory 303 may be partitioned into bins, wherein each bin is associated with data input from a source or stream number of digital bitstreams 310. Notably, in this particular example, buffer memory 303 is illustratively shown as partitioned into first in, first out memories ("FIFOs") 301-0 through 301-(N-1). Each FIFO 301-0 through 301-(N-1) is respectively associated with a bitstream 310-0 through 310-(N-1). Use of a FIFO preserves the order in which data is received in each stream. Notably, other types of buffer memory may be used depending on application 250 of FIG. 2. For example, for video, audio, and other information where sequence of the data is used for clearly outputting information, a FIFO may be a useful choice as a buffer memory. However, other types of data may not be sequence-dependent, and thus other types of buffer memory, such as random access memory ("RAM"), may be used. In particular, with respect to FPGAs and, more particularly, a Virtex-4 from Xilinx, Inc., of San Jose, Calif., BRAMs may be configured as FIFOs. Furthermore, an FPGA may include network interface 203 as well as at least front end decoder 211 if not all of decoder 220.

Data from bitstreams 310-0 through 310-(N-1) may be clocked into their respectively associated FIFOs 301-0 through 301-(N-1) responsive to clock signal 313, which may be controllably applied by controller 302. Notably, clock signal 313 need not originate with controller 302 and may originate from an external clock source (not shown). Furthermore, controller 302 may provide N respective write enable signals 314 for FIFOs 301-0 through 301-(N-1).

Assertion of a write enable signal 314 may be responsive to a load signal 311 and a stream number signal 312 provided from network interface 203 to controller 302. Load signal 311 provides an indication whether data of a bitstream is valid, and thus load signal 311 may be asserted responsive to confirming that data in a digital bitstream of digital bitstreams 310 is valid. Additionally, network interface 203 may have assigned a stream number to each individual digital bitstream based on the digital producer system 201 from which such digital bitstream was sent. Thus, stream number signal 312 may provide an indication of a number associated with the digital bitstream of digital bitstreams 310 having the valid data for which load signal 311 is asserted. In short, input interface 204 obtains data from network interface 203 and stores such obtained data in buffer memory binned according to the bitstream associated therewith. Thus, in effect, input data is demultiplexed responsive to a stream number associated with a digital bitstream of digital bitstreams 310.

Continuing the description of front end decoder 211 of FIG. 3, FIFOs 301-0 through 301-(N-1) may have data stored therein clocked out responsive to clock signal 323, which clock signal may be controllably applied by controller 302, though such clock signal need not originate with controller 302. Furthermore, data may be output from FIFOs 301-0 through 301-(N-1) responsive to respective application of read control signals 324 provided from controller 302. Read control signals 324 may be respectively asserted responsive to read stream signal 321 and stream number signal 322 provided from parser 205 to controller 302. Parser 205 may be implemented as a finite state machine ("FSM"), either as a single FSM or as multiple nested FSMs, capable of state variable capture at switching locations for data within digital bitstreams.

Thus, output of FIFOs 301-0 through 301-(N-1), namely respective digital bitstreams 310-0B through 310-(N-1)B, may be provided to parser 205 responsive to assertion of one or more of read control signals 324. More particularly, one read control signal 324 may be asserted at a time such that parser 205 multiplexes data from multiple digital bitstreams of digital bitstreams 310-0B through 310-(N−1)B to provide output data. The data source for such multiplexing is determined by parser 205, which determination is application dependent, by assertion of read stream signal 321 along with a stream number signal 322 indicating the particular bitstream of digital bitstreams 310-0B through 310-(N−1)B to be read from FIFOs 301-0 through 301-(N−1). Output of parser 205 may be provided to a back end decoder 206 of decoder 220. Back end decoder 206 may be implemented within the same FPGA as front end decoder 211 to provide decoder 220.

Thus, it should be understood that parser 205 communicates to input interface 204 to read data from buffer memory 303, and which particular memory, and thus which particular bitstream, to read from. This communication may be done on an as-needed or on-demand basis in accordance with the application implemented. Thus, input interface 204 provides the targeted read data to parser 205, and parser 205 processes such data to form one or more multiplexed data streams from the multiple digital bitstreams received. In other words, parser 205 may cause input interface 204 to read data from a sequence or other order as dictated by parser 205 for multiplexing such data in such sequence or other order.

Notably, implementation of parser 205 may vary from application to application, but generally will involve implementing multiple registers to store, on a per stream basis, state variables associated with such streams. Thus, parser 205 may be configured to maintain state, namely "pick up where it left off," for each data stream as parser switches between data streams. Notably, to reduce downstream communication and storage, back end decoder 206 may be configured to operate within defined boundaries of input data from digital bitstreams 310. Accordingly, back end decoder 206 may be configured to identify and account for dependencies on values extracted from previous data from a bitstream.

Figure 4:
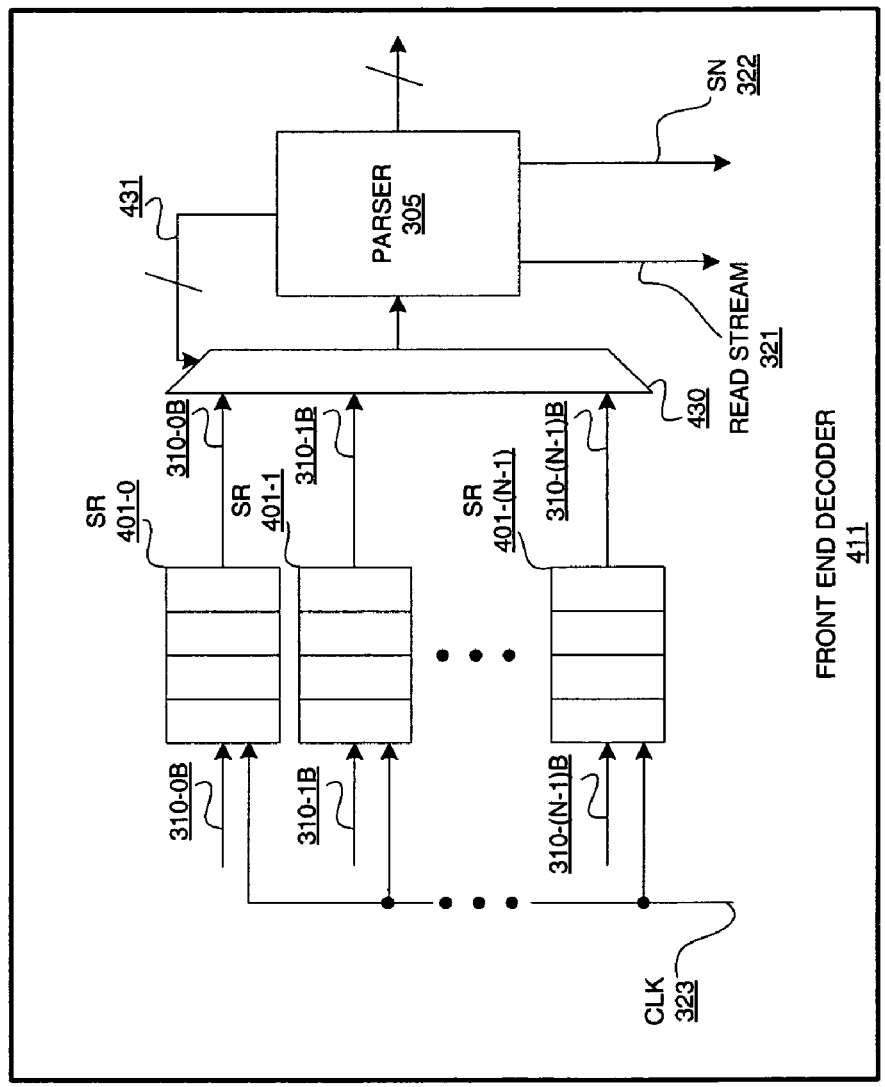
FIG. 4 is a high-level block diagram depicting an alternative exemplary embodiment of a front end decoder in the data consumer system of FIG. 3.

FIG. 4 is a high-level block diagram depicting an alternative exemplary embodiment 411 to front end decoder 211 of FIG. 3. Notably, front end decoder 411 includes all of front end decoder 211 of FIG. 3, though not all of such blocks are shown for purposes of clarity. Front end decoder 411 adds a look-ahead capability to front end decoder 211 of FIG. 3. More particularly, digital bitstreams 310-0B through 310-(N−1)B, having been output from FIFOs 301-0 through 301-(N−1) as described above with respect to FIG. 3, are respectively provided to shift registers 401-0 through 401-(N−1). Notably, in an implementation, shift registers 401-0 through 401-(N−1) may be extensions of FIFOs 301-0 through 301-(N−1) and thus may be an extension of buffer memory 303.

In order to be synchronous with output of FIFOs 301-0 through 301-(N−1), shift registers 401-0 through 401-(N−1) may be clocked responsive to clock signal 323 for both input and output of data from such shift registers. Digital bitstreams 310-0B through 310-(N−1)B, respectively output from shift registers 401-0 through 401-(N−1) responsive to clock signal 323, are input to multiplexer 430. Notably, shift registers 401-0 through 401-(N−1) are illustratively shown as being four bytes or words deep to allow for four words of enhanced visibility within a bitstream to be viewed by parser 305. Parser 305 is parser 205 of FIG. 2, except that parser 305 is configured to provide control signals 431 to control ports of multiplexer 430 to select output from multiplexer 430 from the outputs of shift registers 401-0 through 401-(N−1). Thus, in this particular example, parser 305 may look ahead at four words of a bitstream, for example bitstream 310-0B, by selecting such four words for output from multiplexer 430 responsive to four cycles of clock signal 323 applied to shift registers 401-0 through 401-(N−1). Thus, parser 305 may be configured to determine whether or not to select a particular bitstream for present processing subject to look-ahead status of the data observed. Responsive to such look-ahead status, parser 305 may decide to read such stream and thus assert read stream signal 321 as well as provide a stream number via stream number signal 322.

Figure 5:
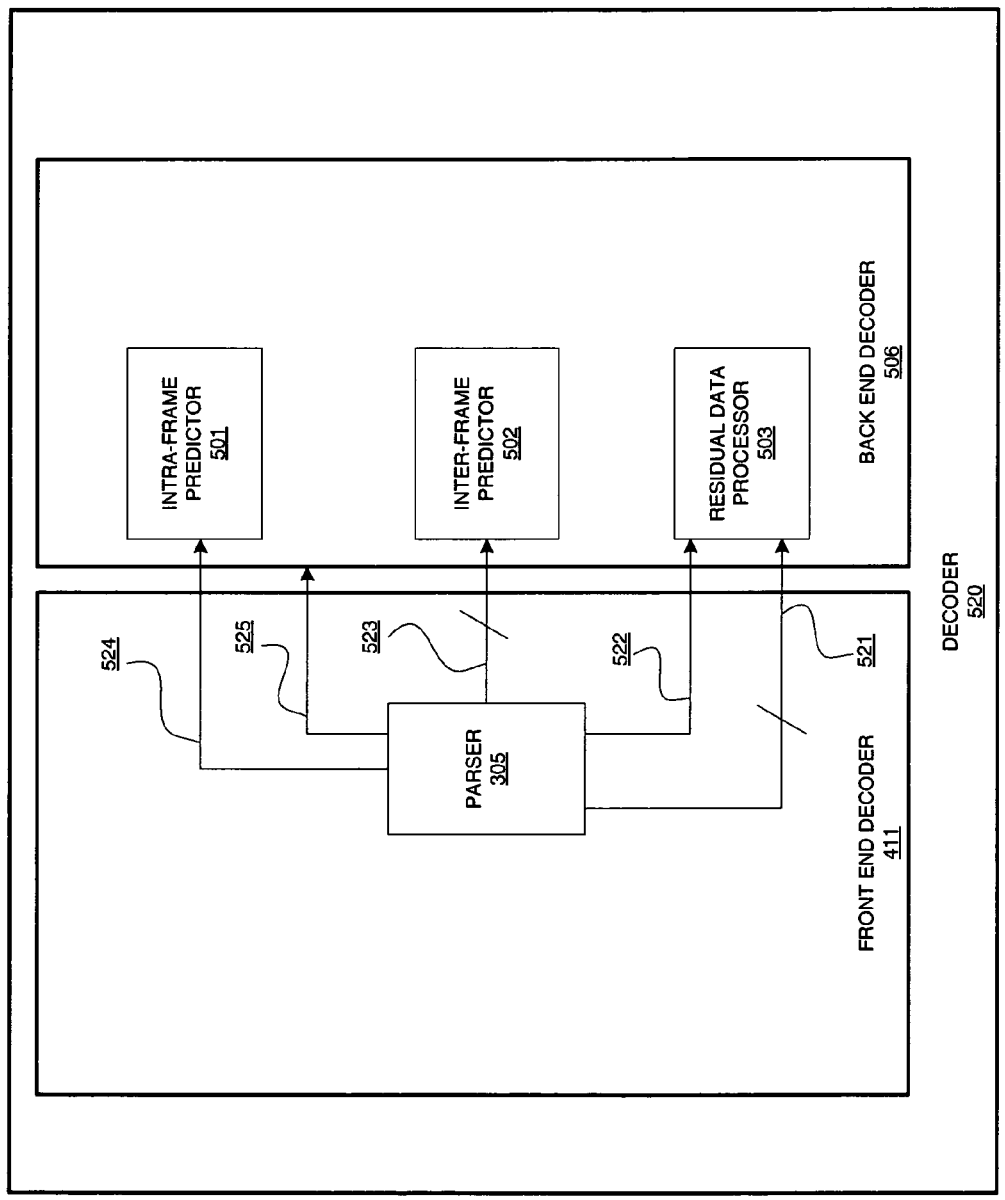
FIG. 5 is a high-level block diagram depicting an exemplary embodiment of a decoder having the front end decoder of FIG. 4.

FIG. 5 is a high-level block diagram depicting an exemplary embodiment of a decoder 520 having front end decoder 411 of FIG. 4. Notably, in this example implementation, decoder 520 is a video decoder. However, it should be appreciated that applications other than video processing of multiple bitstreams, such as in a video conferencing application, for example, may be used as mentioned elsewhere herein.

Front end decoder 411 includes parser 305 which is coupled to intra-frame predictor 501, inter-frame predictor 502, and residual data processor 503 of back end decoder 506. As back end decoder 506 is well known, unnecessary details regarding its configuration are not provided herein for purposes of clarity. Parser 305 in this particular implementation is configured to provide signals 521 through 525, as described below in additional detail.

Data signals 521 are residual coefficients of data, which are provided to residual data processor 503 along with control signal 522. An example of data signals 521 may be discrete cosine transform ("DCT") coefficients as used in a number of video coding standards documented by the MPEG committee (e.g., MPEG-1, MPEG-2, or MPEG-4). Signals 523 are inter-frame motion vectors provided from parser 503 to inter-frame predictor 502. Signal 524 is a control signal provided to intra-frame predictor 501. To reduce storage requirements, a logical stream switching point at video frame boundaries may be selected for this video decoder example. However, other options may be used, such as providing switching points at video packets or slices. In each of these examples, boundaries contain well-defined markers or specific data values in a bitstream to aid switching. For example, a video object plane ("VOP") header, as defined in the MPEG-4 standard, always begins with a 32-bit start code of 0x1B6. If a start code marker in the VOP header is not found where parser 305 expects to see it, then a resynchronization process may be employed until such marker is detected. In this implementation, digital bitstream switching may occur after such a marker is found in order to synchronize between bitstreams. Known blocks of back end decoder 506 for an MPEG-4 decoder include a motion compensation block, a texture update block, and a texture/inverse discrete cosine transform ("texture/IDCT") block. Output of residual data processor 503 may be provided to the texture/IDCT block, and output of inter-frame predictor 502 may be provided to the motion compensation block, not shown for purposes of clarity. Control signal 525 is provided from parser 305 to motion compensation and texture update blocks, also not shown for purposes of clarity. Thus, while the texture update block performs single-event processing and may not require storage of previous values, the motion compensation and texture/IDCT blocks may store values for future reference. However, such storage by the motion compensation and texture/IDCT blocks need not cross video frame or video packet boundaries. Accordingly, these blocks may be simplified as such storage does not cross video frame or video packet boundaries. Furthermore, frame boundary identification is facilitated by using frame boundaries as switching points. Thus, for example, a chosen sequence of input data selection may be as follows: frame 0 of bitstream 0, frame 0 of bitstream 1, . . . frame 0 of bitstream (N−1), frame 1 of bitstream 0, frame 1 of bitstream 1, . . . frame 1 of bitstream (N−1), and so on. Again, other applications may have other switching points which are better suited to their particular application.

Figure 6:
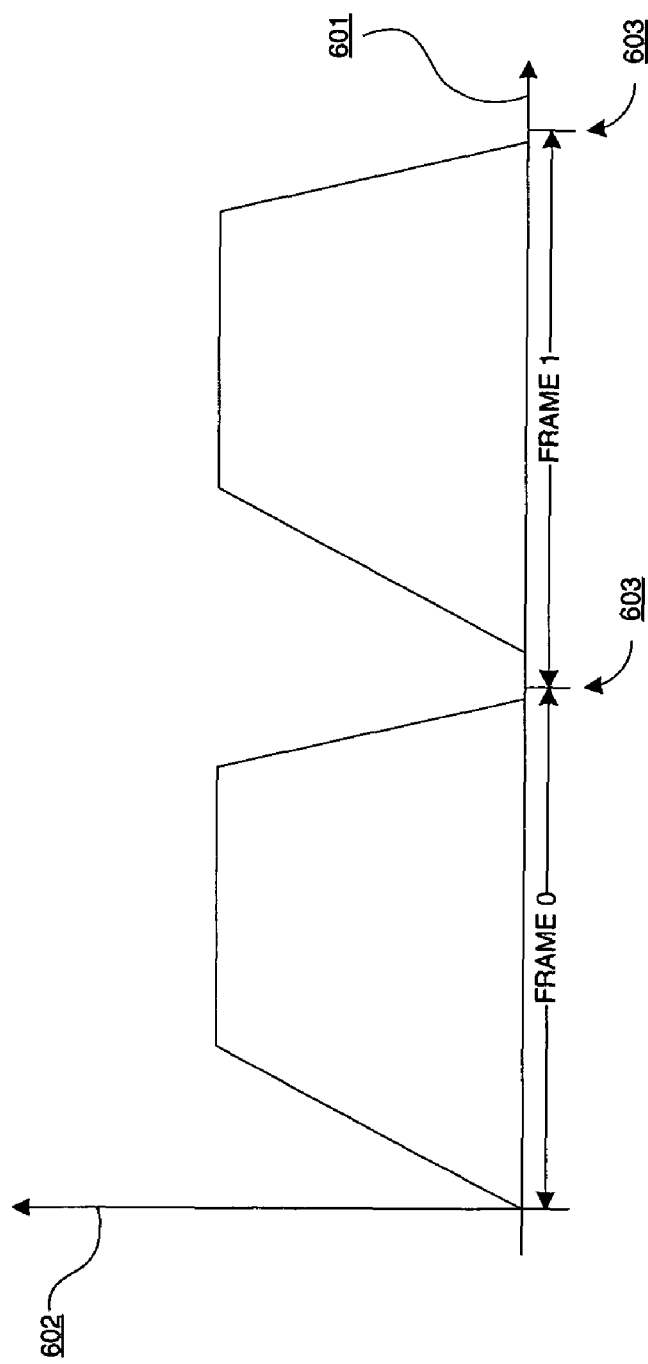
FIG. 6 is a graphical illustration depicting an exemplary embodiment of using frame boundaries as bitstream switching points for a video decoder application.

FIG. 6 is a graphical illustration depicting an exemplary embodiment of using frame boundaries as bitstream switching points for an MPEG-4 application. X-axis 601 indicates time and y-axis 602 indicates frame information stored. Information stored for the MPEG, for example, or any similar frame-based processing application, reduces to near zero at frame boundaries 603. In other words, a pipeline implementation for processing frames of data may be flushed at the end of a frame, such as generally at 603 of either frame 0 or frame 1, and no important information would be lost. This allows parser 305 configured with one or more FSMs to "start from scratch" at the beginning of a frame for the next stream. Accordingly, state variable capture is simplified by having a stream switching point where no important information would be lost due to the switching of streams. This in turn minimizes the required size of the memory storage for parser 305 as well as some or all downstream elements contained in back end decoder 506.

FIG. 7 is a pseudo-code listing of an exemplary embodiment of a parser 700. Parser 700 may be used for implementing parser 205 of FIG. 2 for example. Parser 700 may begin with a case statement 701, such as a case statement for a finite state machine. Following case statement 701 may be an initialization section or state 702.

Following initialization section 702 may be a header parsing section 703. Header parsing section 703 for this example is for reading all "main" headers consecutively. The phrase "main" headers is to indicate that these headers are bitstream headers that precede data frames or packets of such bitstream. Thus, there is a main header prior to any data frame or packet of a bitstream. Notably, once all main headers are processed for all bitstreams, an instantiated state machine need not return to state 703 for an application.

For parsing main headers of respective bitstreams, main headers are identified for each frame or packet of data, or groupings thereof, associated with the main headers. As an alternative to reading all main headers consecutively, headers may be read as they arrive as a sub-process. However, parsing all main headers sequentially allows for any testing or analysis to be performed without unnecessary delay. Examples of such testing/analyzing of streams may include one or more of: determining if the stream is compliant with a protocol; and determining whether a current build of a design can handle stream parameters such as data rate, such as frame rate, and data size, such as frame size. Moreover, parsing of main headers may be done before a first data frame of a stream is received to reduce latency.

A data parsing section 704 may follow after header parsing section 703. Data parsing section 704 may be for parsing data from data streams. Data frame or packet headers, as opposed to main headers, are processed as part of data in data parsing section 704, which is referred to as "data chunk" in the listing of FIG. 7. Data frames or packets may be entire video frames or packets for example. However, a user may select a different break point other than, for example, between frames or between packets, for the user's application, and thus something other than frames or packets may be used. After data parsing section 704, an end of case statement 705 may be used for a finite state machine.

Accordingly, it should be appreciated that a multi-stream system has been described for multiplexing data from multiple digital bitstreams using a single decoder. More particularly, a single parser is configured to operate on multiple digital bitstreams, and switch between such streams using state variable storage implemented vis-á-vis one or more FSMs. Data obtained may be tagged from a single input communication channel for demultiplexing into storage elements. Such stored demultiplexed data may be subsequently multiplexed on an as-needed or on-demand basis as requested from a parser. Furthermore, look-ahead capabilities may be provided within each of such bitstreams. Lastly, a video application example that uses frame-based content switching may be implemented with reduced downstream storage impact.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for multiplexing data from bitstreams, comprising:
   determining data status for data of each of the bitstreams;
   assigning stream numbers respectively to the bitstreams such that each of the bitstreams has an associated stream number associated with a source of the bitstream;
   controllably storing the data of each of the bitstreams in respective memory buffers according to the data status for the data of each of the bitstreams and the stream number of each of the bitstreams, the bitstreams and the memory buffers being associated with one another;
   controllably selecting a memory buffer of the memory buffers from which to obtain the data stored therein;
   parsing the data obtained from the memory buffer selected to provide an output;
   loading the data stored in each of the memory buffers into respective shift registers for respective look-ahead operations, wherein controllably selecting a memory buffer comprises selecting the memory buffer according to a look-ahead status of the data stored in the respective shift registers determined according to the look-ahead operations; and
   repeating the controllably selecting and the parsing to obtain and parse the data stored in at least one other memory buffer of the memory buffers to provide the output with the data obtained from the at least one other memory buffer in addition to the data obtained from the memory buffer;
   providing the output to a single back-end decoder, wherein the output is multiplexed data from the bitstreams respectively associated with the memory buffer and the at least one other memory buffer; and
   wherein the multiplexed data has switching points therein, wherein each switching point comprises a frame boundary, and wherein controllably selecting a memory buffer of the memory buffers from which to obtain the data stored therein further comprises selecting the memory buffer to coincide with a switching point within the multiplexed data.

2. The method according to claim 1, wherein the controllably selecting includes:
   asserting a read command along with the stream number for a bitstream associated with the memory buffer selected; and
   reading the data from the memory buffer responsive to the read command and the stream number of the bitstream associated with the memory buffer selected.

3. The method according to claim 1, further comprising multiplexing outputs from the shift registers responsive to the look-ahead operations.

4. The method according to claim 3, wherein the data status is associated with identification of valid data.

5. The method according to claim 1, further comprising storing state of each bitstream when selecting a bitstream from the bitstreams for processing.

6. The method according to claim 5, wherein the memory buffers are configured from random access memories.

7. The method according to claim 6, wherein the random access memories are block random access memories of a programmable logic device.

8. The method according to claim 7, wherein the programmable logic device is a Field Programmable Gate Array.

9. A decoder, comprising:
a front end decoder including an input interface coupled to a parser;
and a single back end decoder coupled to the parser of the front end decoder;
the input interface including first storage buffers respectively coupled to receive a plurality of data streams and a controller coupled to the first storage buffers and the parser;
the decoder further comprising second storage buffers respectively coupled to the first storage buffers to receive each of the data streams after buffering in the first storage buffers;
the controller configured to provide respective write control signals to the first storage buffers and to provide respective read control signals to the first storage buffers;
the controller configured to assert the write control signals responsive to data status and stream number information respectively associated with the data streams;
the controller configured to assert the read control signals responsive to read stream commands and stream numbers asserted in respective pairs for respectively reading the data streams, the read stream commands and the stream numbers being from the parser;
the stream numbers being associated with sources of the data streams; and
the parser coupled to the first and the second storage buffers to receive each of the data streams after buffering in the first storage buffers responsive to selective assertion of the read control signals according to a look-ahead status of data stored in the second storage buffers determined according to look-ahead operations, and wherein the parser is configured to obtain data from each of the data streams for providing a multiplexed output therefrom having switching points therein, wherein each switching point comprises a frame boundary, and wherein the parser is configured to assert the read stream commands and the stream numbers to coincide with a switching point within the multiplexed output.

10. The decoder according to claim 9, wherein the pairs are asserted one pair at a time for reading the data streams one at a time.

11. The decoder according to claim 10, wherein the read control signals and the write control signals are asserted one at a time.

12. The decoder according to claim 9, wherein the parser is configured to store state of each bitstream when selecting a bitstream from the plurality of bitstreams for processing.

13. The decoder according to claim 9, further comprising a multiplexer coupled to receive each of the data streams after buffering in the second storage buffers, the multiplexer coupled to the parser to provide the multiplexed output from the data streams responsive to a select signal provided from the parser to the multiplexer.

14. The decoder according to claim 13, wherein the first storage buffers are formed from random access memory as first-in, first-out buffers, and wherein the second storage buffers are shift registers.

15. The decoder according to claim 14, wherein the shift registers are look-ahead buffers.

16. The decoder according to claim 14, wherein the first-in, first-out buffers are clocked responsive to a first clock signal on an input side and clocked responsive to a second clock signal on an output side, and wherein the shift registers are clocked responsive to the second clock signal.

17. The decoder according to claim 13, wherein the random access memory is block random access memory of a Field Programmable Gate Array, and wherein the shift registers are formed using at least one configurable logic block of the Field Programmable Gate Array.

18. A system for multiplexing data from bitstreams, comprising:
a network interface coupled to receive the bitstreams and configured to identify the bitstreams by bitstream number and to check data status of the bitstreams;
a decoder coupled to the network interface to receive the bitstreams therefrom, the decoder including:
a front end decoder including an input interface coupled to a parser; and
a single back end decoder coupled to the parser of the front end decoder;
the input interface including storage buffers respectively coupled to receive the bitstreams and a controller coupled to the storage buffers and the parser;
the decoder further comprising look-ahead buffers coupled to the storage buffers to receive each of the data streams after buffering in the storage buffers;
the controller configured to provide respective write control signals to the storage buffers and to provide respective read control signals to the storage buffers;
the controller configured to assert the write control signals responsive to the data status and the bitstream number obtained from the network interface for the bitstreams;
the controller configured to assert the read control signals responsive to read stream commands and stream numbers asserted in respective pairs for respectively reading the data streams, the read stream commands and the stream numbers being asserted by the parser;
the stream numbers being associated with sources of the data streams; and
the parser coupled to the storage buffers and the look-ahead buffers to receive each of the bitstreams after buffering in the storage buffers responsive to selective assertion of the read control signals according to a look-ahead status of data stored within the look-ahead buffers determined according to look-ahead operations, and wherein the parser is configured to obtain data from each of the data streams for providing a multiplexed output therefrom having switching points therein, wherein each switching point comprises a frame boundary, and wherein the parser is configured to assert the read stream commands and the stream numbers to coincide with a switching point within the multiplexed output.

* * * * *